United States Patent
Tomazic

Patent Number: 5,436,087
Date of Patent: Jul. 25, 1995

[54] PROCESS FOR REDUCING UNWANTED SPECIFIC ELECTRO CHEMICAL CONVERSION IN RECHARGEABLE BATTERIES

[75] Inventor: Gerd Tomazic, Murzzuschlag, Austria

[73] Assignee: FA. Elin Energieanwendung Gesellschaft M.B.H., Vienna, Austria

[21] Appl. No.: 244,714

[22] PCT Filed: Dec. 17, 1992

[86] PCT No.: PCT/AT92/00168
§ 371 Date: Jun. 14, 1994
§ 102(e) Date: Jun. 14, 1994

[87] PCT Pub. No.: WO93/12555
PCT Pub. Date: Jun. 24, 1993

[30] Foreign Application Priority Data
Dec. 18, 1992 [AT] Austria ............... A2505/91

[51] Int. Cl.⁶ ................................... H01M 10/42
[52] U.S. Cl. .......................... 429/50; 429/48; 429/105
[58] Field of Search ............ 429/48, 50, 51, 105, 429/67, 72, 81, 210, 14, 15, 199

[56] References Cited
U.S. PATENT DOCUMENTS
4,072,540 2/1978 Symons et al. ............... 429/67 X
4,614,693 9/1986 Hashimoto et al. ..
4,663,251 5/1987 Sasaki et al. .................. 429/105 X
4,677,039 6/1987 Sasaki et al. ..

FOREIGN PATENT DOCUMENTS
2022459 2/1991 Canada .
0165000 12/1985 European Pat. Off. .
0343144 11/1989 European Pat. Off. .
0411614 2/1991 European Pat. Off. .
0434659 6/1991 European Pat. Off. .

OTHER PUBLICATIONS
International Search Report and Annex.

Primary Examiner—Anthony Skapars
Attorney, Agent, or Firm—Sandler, Greenblum & Bernstein

[57] ABSTRACT

A process for reducing unwanted specific electrochemical conversion in rechargeable batteries with circulating electrolytes and bipolar electrodes with diaphragms therebetween to form anolyte or catholyte chambers. When a working element such as a motor is electrically disconnected from the battery, a regulating and/or control mechanism may also be disconnected and circulation of the electrolyte is stopped. Additionally, or alternatively, the battery may be intermittently charged during disconnection of the working element and stoppage of the electrolytic circulation.

12 Claims, 1 Drawing Sheet

PROCESS FOR REDUCING UNWANTED SPECIFIC ELECTRO CHEMICAL CONVERSION IN RECHARGEABLE BATTERIES

BACKGROUND OF THE INVENTION

1. Field of the Invention

The invention relates to a process for reducing unwanted specific electrochemical conversion in rechargeable batteries.

2. Description of Background and Other Information

Storage of energy in its varied forms is a problem which has been given primary attention in technology.

Thermal energy can be stored by heat accumulators having temperatures above or below the normal temperature. Such storage requires that these energy accumulators have reservoirs with thermal insulation.

Latent heat accumulators can also be used for storing thermal energy. In this case, chemical elements or compounds are stored, and insulated against their environment, just above or below their conversion temperature. When a threshold temperature is exceeded in either direction, an additional excess or shortage of thermal energy is released, so that either a lowering or raising of the temperature of the media with respect to the ambient temperature is performed.

As is well known, kinetic energy can be generated by raising the potential energy of energy-storing media and converting the same. As a typical example, storage power plants having pump-fed power storage plants, wherein during times of an excess of electrical energy, the pumps are used to lift water from a potentially lower energy level to a potentially higher energy level. This potential difference as a rule is realized by pumping water from a lower lake level to a higher lake level, so that in times of need for energy the potential energy of the water can be made available as electrical energy by conversion by means of turbines and generators.

Although the storage of energy as electrical energy theoretically has a high degree of efficiency when converted to light, and particularly, to heat; in practice, large technical conversions have encountered a great number of difficulties. For example, the conversion of electrical energy through electrolysis of water to form hydrogen and oxygen, for storage in this form and then reconverting to obtain electrical energy by means of combustion elements, wherein a recombination of hydrogen and oxygen takes place, has not been possible so far on a large technical scale with an appropriate degree of efficiency. Other experimental conversions, with appropriate pairings such as sodium and sulfur, have also failed on a large technical scale, because either high temperatures are required to achieve the appropriate energy density and therefore current output, or the respective devices, because of their operating conditions (e.g., increased temperatures) have only made possible a short service life or low efficiency.

Electrochemical energy reservoirs also have the disadvantage that, on the one hand, their storage capabilities are relatively poor, or that during storage, chemical and electrochemical discharge processes, which are difficult to control, occur, particularly with multi-cell batteries or accumulators.

It is basically possible to distinguish between two different reservoir types in the storage of electrochemical energy. In one reservoir type, the chemical element or chemical compound, the potential energy of which was increased, is placed into or against the electrode. This requires a bipolar electrode. In a second reservoir type, one or two electrochemically effective elements or materials are not placed against or into the electrode, but, instead are placed in their own accumulator. A fluid electrolyte is used for transport, and storage takes place in the reservoirs for anodically or cathodically effective substances. A particularly advantageous storage of electrical energy by means of a circulating electrolyte consists in that the substance acting on the cathode, i.e. a metal (e.g., zinc), is deposited on the cathodically effective surface of the electrode. The element deposited on the anode is guided into a reservoir, wherein a uniform activity of the element is made possible by means of a complex (e.g., an ammonia complex for the bromine molecule), which is only conditionally soluble in the electrolyte (e.g., an aqueous electrolyte).

The principles for storing energy, as discussed above, have been known for a long time, but in practice, the efficiency and the service life of the respective electrochemical reservoirs have been unacceptable, and have consequently hampered their broad employment.

A phenomenon of the electrochemical reservoirs which has received little attention is the loss of potential chemical energy when not in use.

In cases where the phenomenon has been addressed, it is known from EP 0 168 377 A1, to prevent the stray currents, which in a zinc-bromine battery with a circulating electrolyte, run between the individual half-cells when it is idle, i.e. during the period in which current is neither removed from nor supplied to the battery. Such prevention is approached by stopping the second-order electrical connections, and disrupting the flows to and from the individual anode or cathode chambers. Either blocking elements or an appropriate arrangement of the connections are provided for disrupting the flows. Thus, airing of the chamber or chambers can be conducted during which the electrolyte in the lines can be stopped, or replacement of the electrolyte can be accomplished.

However, the loss of potential chemical or electrical energy does not occur only because of routing the flow by means of the supply or draining of electrolyte fluids. Additionally, there is the possibility that the individual cells take care of mutual charge and discharge to establish homogeneous charge equilibrium therebetween. Thus, mutual charging and discharging takes place with, for example, parallel connected batteries or cell packages which have, for example, a plurality of series-connected electrodes, in particular bipolar electrodes.

With the cooperation of diaphragms, this charging process can result in a deposit of metal cathodically on the anode, a phenomenon previously unknown up to now. Consequently, after a predetermined idle period, it becomes practically impossible to draw current from the battery, because it is necessary to first remove the zinc coating from the anode, for example, in order to result in a half cell capable of output.

A process for the specific electrochemical conversion in galvanic cells, in particular a zinc-bromine battery, is known from EP 0 434 659 A2, wherein cell packages or batteries are connected in parallel during charging for better energy utilization, and wherein during discharging, i.e. taking out of current, a switch into series takes place.

SUMMARY OF THE INVENTION

It is the object of the present invention to provide a method for reducing unwanted specific electrochemical conversion in rechargeable batteries and/or cell packages, in particular in connection with zinc-bromine cells. It is an object to provide a conversion which does not cause unnecessary losses even during idle times (i.e. during those periods of time where the battery is only on standby), and to avoid the change of polarity of the cells, in particular, to avoid conversion of an anodic cell to a cathodic cell.

It is a further object to provide a process as described above, in which circulating (e.g., pumped) electrolytes are passed among bipolar electrodes connected in series. Diaphragms are disposed between the bipolar electrodes and anolyte or catolyte chambers are thus formed. The appropriate electrolyte respectively flows, at least partially, in parallel connection. Electrically operable working means, for example motors for mobile employment and electrical regulating and/or control elements, are connected with the battery, in a manner such that with non-circulating electrolytes and with the working means electrically disconnected, the regulating and/or control elements are also disconnected, and/or that with non-circulating electrolytes and electrically disconnected working means, the battery and/or cell packages are at least partially charged (e.g., a current is applied during at least a portion of the idle time).

Rechargeable batteries with circulating electrodes, wherein the electrode chambers are supplied at least partially connected in parallel, have the advantage that the electrolyte is supplied in the same concentration to all electrodes, wherein the amount of at least one electrochemically active element or active compounds is not limited by the electrode surface or the anode or cathode chamber because of the circulating electrolyte. When current is used, the anolyte as well as the catholyte are kept circulating so that there can be no zinc deposits, for example, on the anode.

When the working means, for example an electric motor or the like, is turned off, the circulation of the electrolyte is generally interrupted at the same time. However, if regulating or control elements are allowed to continue to be connected to a battery when circulation stops, there can be conversions because of minute differences in the concentration of the electrolyte or in the geometry of the individual cells. If even the smallest current consumption, such as is caused by the regulating and/or control elements, is avoided, such conversions can be prevented.

Another object requires that when the electrolyte(s) is/are not circulating, the battery and/or cell packages must be at least partially charged so that, for example, zinc deposits beginning to form on the anode surface are dissolved by the elemental bromine or the like which is generated during charging. Thus, zinc deposit per se is prevented.

Yet another object is the prevention of strong deposits of metallic layers on the anodic surface by temporarily circulating an anolyte containing an oxidized anion (e.g., bromine), even when the working means is switched off. Such temporary circulation helps to prevent a strong deposit of cations on the anode even in a situation of decreased efficiency.

Different pressures can be built up in the anolyte and catholyte circuit to control the electrochemical processes during the operating as well as the idle phases. Either the electrochemically effective cations or anions, and also their oxidized or reduced forms, are controlled to reach the respectively other electrode chamber, so that undesired deposits can be dissolved and/or thinning of the electrochemically active substances can be achieved.

A particularly simple measure for controlling the pressure includes controlling the maximum pressure in the anolyte and/or catholyte circuit, so that undesired pressure peaks and excessive diffusion processes are prevented. At the same time overpressurization of the individual electrode chambers is provided. The individual electrode chambers may be constructed of plastic diaphragms of polyethylene and of electrodes bonded with plastic, for example.

Control of the pressure in the anolyte and/or catholyte circuit may also be effected by controlling the rpm of the pumps or of the driving means thereof, wherein a defined pressure difference, or a constant pressure can be maintained at any desired time.

Further, control of the pressure in one or both electrolyte circuits can be effected by flow throttles, for example in the lines. These throttles furthermore provide a particularly good mixing within the electrolytes, even in normal operation.

In the case of batteries and/or cell packages which are electrically connected in parallel, if the electrical connection therebetween is at least partially interrupted when the working means are idle, and if the electrical circuit(s) are thereafter restored for operating the working means, conversion between the batteries or cell packages is prevented. At the same time, it is also possible to prevent an undesired cathodic deposition on the anode.

If an electrochemically active element, molecule and/or compound, in particular an electrolyte low in bromine, is introduced into the anolytic chambers for stopping the working means, an undesired deposit is prevented even in the start-up phase. Thus, excessively high capacity losses because of silent electrical discharges are prevented at the same time.

If the electrical connection is interrupted via the electrolyte supply lines and/or drain lines to idle the working means, electrochemical conversions which are caused by the guidance of the flow of the electrolyte supply and drain lines are assuredly prevented. Accordingly, this additionally reduces the energy losses during idleness of the battery.

BRIEF DESCRIPTION OF THE DRAWINGS

The invention will be described in detail below by means of the drawings, in which.

DETAILED DESCRIPTION OF PREFERRED EMBODIMENTS

Figure 1:
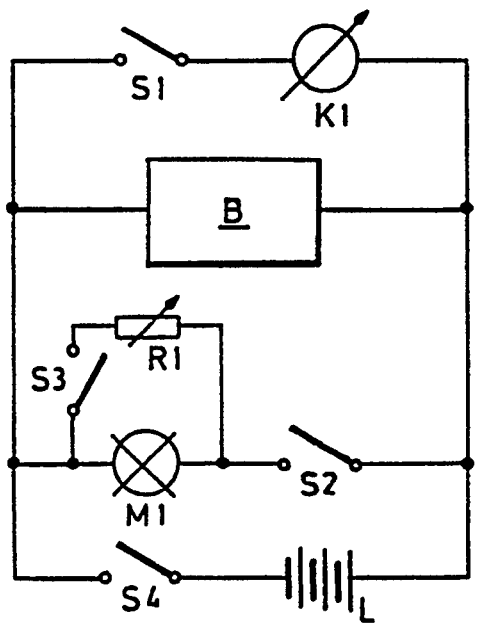
FIG. 1 is a schematic of an electrical circuit according to the present invention.

With reference to FIG. 1, B indicates a zinc-bromine battery with a maximum voltage of 216 V and a total capacity of 22 kWh. This battery is constructed of a plurality of bipolar electrodes. The bipolar electrodes are constructed of plastic bonded with carbon, and have an edge of non-conducting plastic. Paraffinic plastics, in particular polyethylene, may be used as preferred plastic materials. Diaphragms are disposed between the electrodes. Zinc and bromine are provided as an electrochemically effective pairing, wherein zinc is deposited on the cathode during the charging process and molecular bromine is deposited on the anode. In order to provide appropriate dimensioning of the electrode chambers, the bromine is bonded to a complexing agent.

The complexing agent itself is water-soluble. In contrast thereto, the bromine complex has only a low solubility in the electrolyte, so that a suspension is created during charging, and the suspension is pumped off. The activity of the bromine is determined by the solubility of the complex in the aqueous electrolyte and by the available oily phase at the electrode. For a long-term operation of the battery, it is necessary to keep the catolyte as well as the anolyte circulating, so that, on the one hand, bromine is conveyed to the electrode during the discharge process, and any deposited zinc can be removed from the electrode chamber. The battery B has collector electrodes at its ends for removal as well as supply of current.

A control element K1 is provided for checking the charge state of the battery, which shows a current consumption of 10 mA when the switch S1 is closed. A consumer M1 is also connected to the battery, and the circuit can be closed and opened via the switch S2. A regulating element R1 for regulating the power input of the consumer is connected in parallel with the consumer M1. Connection and disconnection of the regulating element is possible via the switch S3. A charge current source L can be connected and disconnected via the switch S4.

Figure 2:
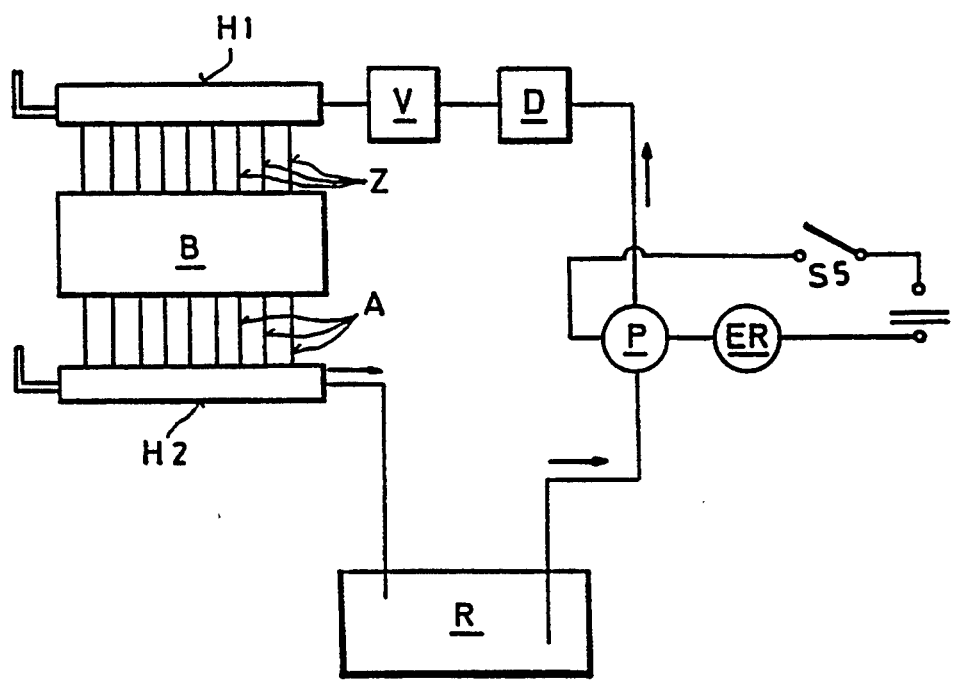
FIG. 2 is a schematic showing of a hydraulic circulation of a battery with circulating electrolytes.

The circulation of only one electrolyte is shown in the hydraulic diagram-represented in FIG. 2, however, an analogous hydraulic circuit may be provided for circulation of a further electrolyte. The battery may optionally have two or more parts, wherein several hydraulic circulations can be provided. In that case there are also series-connected cell packages and it is also possible to provide individual drains so that, for example, different voltages can be picked along one battery.

The battery B has a reservoir R for electrolyte. In the case of a zinc-bromine battery, two liquids are disposed in this reservoir, namely the heavy bromine complex with a quaternary ammonia base and the remaining aqueous electrolyte. In the course of aspiration for discharging the battery, a liquid/liquid suspension is aspirated via a suitable mixing device, not shown, by the pump P. The pump, which can be switched on and off via a switch S5, has an electronic control ER, by means of which the output of the pump and therefore the pressure applied to the electrolytes, can be controlled.

In addition to or in place of the electronic control it is also possible to provide a throttle D, which is simultaneously used as a static mixing element. Such a throttle may be provided only in one electrolyte circulation or, if desired, a throttle may be provided for each of the electrolyte circulations. In the latter case, the throttle in the bromine circulation, for example, has a reduced free flow cross section, so that a pressure reduction in the bromine circulation can be achieved in order to take the desired pressure differences into consideration.

Accordingly, during operation, the diffusion of bromine out of the anolyte chamber into the catolyte chamber is kept as low as possible. In addition to or instead of the electronic control of the throttle, it is possible to provide a pressure control valve V. By means of an appropriate setting of the maximum pressure, it is possible to maintain different-working pressures, wherein the pressure control valve V empties via its own line (not shown) into a catch reservoir. In turn, the catch reservoir is connected with the reservoir via a pressure equalization line. Thus, by means of pressures of different intensities it is possible to realize here, too, a pressure difference between the two electrolyte circulations in a particularly simple manner.

For example, a pressure of 45 N/cm$^2$ in the catholyte and of 50 N/cm$^2$ in the anolyte is desirable, wherein there are only slight additional stresses on the diaphragms and the electrodes by this slight pressure difference. The electrolyte then reaches the cock H1 in which a split of the flow into the individual supply lines terminating in the electrode chambers takes place. The individual electrolyte flows from the electrolyte chambers through the drain lines A are again collected in the cock H2 and returned to the reservoirs R.

The two cocks H1 and H2 have taps (not shown), by means of which the hydraulic as well as the electrical second order connection between the individual electrode chambers can be prevented. This simultaneously prevents stray currents between the individual cells, because of which a reduction of the capacity during idleness of the battery is also diminished. For compensating stray currents during the operation of the battery, it is possible to apply a counter-voltage along the connecting channel of the tap, which compensates the stray currents.

Further details of the present invention are provided in the examples which follow.

EXAMPLE 1

The above-described zinc-bromine battery with a maximum voltage of 216 V and with a capacity of 22 kWh at full charge was placed under a load by a current drain of 10 mA exclusively via the control element K1. After 60 hours, the zinc of the cathodes had been transferred to a considerable extent to the anodes. The remaining capacity was 64 Ah. This value lies considerably below the value which the battery should have on the basis of the consumption of the control element K1. The battery was then divided transversely in the direction of the electrodes and it was shown that, except for electrode Nos. 5, 6 and 7, all other electrodes had a zinc deposit on both sides, although it did not completely cover them.

EXAMPLE 2

The operation was analogous to Example 1, but additionally, at intervals of two hours, the battery was supplied with respectively short charge current pulses. The capacity of the battery was determined after 60 hours, to be 95 Ah. Therefore the capacity of the battery was higher by 31 Ah in comparison to that of Example 1, although only 0.6 Ah charge current had been supplied. In Example 1 as well as in Example 2 and the following ones, no circulation of the electrolyte occurred while the consumer was switched off. In addition, the respective cocks were closed, so that current losses because of stray currents were prevented.

EXAMPLE 3

Two batteries in accordance with Example 1 were connected in parallel, wherein one battery had a lesser capacity compared with the other one, so that the first battery had to be considered as a consumer of the second battery. The capacity of both batteries fell to 12% of the initial value after 48 hours.

EXAMPLE 4

The parallel connected batteries in accordance with Example 3 were further provided with a control element K1 as described above, with a current consumption of 20 mA connected to them. The capacity reduction after 60 hours was 82%. Thus, a greater capacity reduction was observed than could be explained by the power consumption of the control element alone.

EXAMPLE 5

The arrangement in accordance with Example 3 was provided with short current charges and the capacity of the battery after 60 hours was 88%, i.e., the difference between the various capacities cannot be traced to the energy supply by means of the charge current and a further explanation must be found.

EXAMPLE 6

The arrangement in accordance with Example 3 was provided with a steady current charge of 5 mA, and after 48 hours the capacity of the battery was 93% of the initial capacity. Here, too, the small amount of the charge cannot explain the great difference.

In place of current charges it is also possible to provide for a supply of bromine-containing electrolyte from time to time, wherein aspiration from the reservoir takes place in such a way that, instead of a suspension, only the aqueous electrolyte containing a small amount of the zinc-bromine complex dissolved therein is supplied to the anode chamber. It was also possible with this procedure to obtain a maintenance of capacity similar to that of the recited examples.

I claim:

1. A process for reducing an undesirable specific electrochemical conversion in rechargeable batteries and/or cell packages having circulating electrolytes, bipolar electrodes connected in series, diaphragms disposed between the bipolar electrodes to form anolyte or catholyte chambers through which the appropriate electrolyte respectively flows, which are electrically connected with working means and electrical regulating and/or control elements, said process comprising:
   electrically disconnecting the working means and the regulating and/or control elements;
   stopping the circulation of the electrolytes while the working means are electrically disconnected; and
   at least intermittently charging the battery and/or cell packages while the working means are electrically disconnected and the circulation of the electrolytes is stopped.

2. A process in accordance with claim 1, further comprising intermittently circulating the electrolyte containing an oxidized anion, when the working means are disconnected.

3. A process in accordance with claim 1, further comprising building up different pressures in anolyte and catholyte circulations with respect to one another.

4. A process in accordance with claim 1, further comprising controlling the maximum pressure in the anolyte and/or catholyte circulation making up the electrolytic circulation.

5. A process in accordance with claim 1, further comprising pressurizing the anolyte and/or catolyte circulation by controlling the rpm of pumps or working means thereof.

6. A process in accordance with claim 1, further comprising controlling the pressure of the electrolyte circulation(s) by use of flow throttles.

7. A process in accordance with claim 1, further comprising electrically disconnecting a parallel arrangement of the batteries and/or cell packages, during the stoppage of the working means, and reconnecting the circuit(s) for operating the working means.

8. A process in accordance with claim 1, further comprising introducing an electrolyte which is low in the electrochemically active element, molecule and/or compound, into the anolyte chambers during the stoppage of the working means.

9. A process in accordance with claim 1, further comprising interrupting the electrical connection of the electrolyte chambers, via the electrolyte supply and drain lines during the stoppage of the working means.

10. A process according to claim 2, wherein the oxidized anion comprises bromine anion.

11. A process in accordance with claim 6, further comprising simultaneous use of the flow throttles as static oxidizing elements.

12. A process in accordance with claim 8, wherein the electrolyte is low in bromine concentration.

* * * * *